United States Patent
Takeo

(10) Patent No.: US 10,776,060 B2
(45) Date of Patent: Sep. 15, 2020

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Akinori Takeo, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/168,524

(22) Filed: Oct. 23, 2018

(65) Prior Publication Data

US 2019/0146739 A1 May 16, 2019

(30) Foreign Application Priority Data

Nov. 14, 2017 (JP) ................................. 2017-219341

(51) Int. Cl.
- *G06F 3/12* (2006.01)
- *B65H 37/04* (2006.01)
- *G06K 15/02* (2006.01)

(52) U.S. Cl.
CPC .......... *G06F 3/1276* (2013.01); *G06F 3/1204* (2013.01); *G06F 3/1257* (2013.01); *G06F 3/1285* (2013.01); *B65H 37/04* (2013.01); *G06F 2206/1514* (2013.01)

(58) Field of Classification Search
None
See application file for complete search history.

(56) References Cited

U.S. PATENT DOCUMENTS

| | | | | |
|---|---|---|---|---|
| 6,381,442 B1* | 4/2002 | Okitsu | ............... | G03G 15/6541 270/58.08 |
| 2007/0177164 A1* | 8/2007 | Ahmad | ................. | G06F 3/1205 358/1.1 |
| 2014/0363187 A1* | 12/2014 | Kanamoto | ......... | G03G 15/5016 399/81 |
| 2016/0016753 A1* | 1/2016 | Suzuki | ................. | G06K 15/404 270/58.08 |
| 2016/0185561 A1* | 6/2016 | Kanamoto | ......... | G03G 15/6544 270/1.01 |
| 2016/0194173 A1* | 7/2016 | Okada | .................... | B65H 37/04 270/58.09 |
| 2018/0141352 A1* | 5/2018 | Watanabe | ............ | B41J 13/0018 |

FOREIGN PATENT DOCUMENTS

JP 2011188294 A 9/2011

* cited by examiner

*Primary Examiner* — Beniyam Menberu

(74) *Attorney, Agent, or Firm* — Canon U.S.A., Inc. I.P. Division

(57) ABSTRACT

An image processing apparatus includes first and second sheet storage units and a post-processing unit to perform specific post-processing on a printed sheet. A print command is received in which a sheet in the first sheet storage unit is specified as a sheet to be used in printing a first copy and a sheet in the second sheet storage unit is specified as a sheet to he used in printing a second copy. In a case where the specific post-processing is unable to he performed on the sheet to be used in printing the first copy, a printed sheet is output without causing the post-processing unit to perform the specific post-processing on the sheets for the first and second copies, even if the print command commands that the specific post-processing be performed in printing the first copy and the second copy.

20 Claims, 12 Drawing Sheets

| SHEET TYPE | STAPLE TYPE | | |
|---|---|---|---|
| | NEEDLE STAPLING | NEEDLELESS STAPLING | SADDLE STAPLING |
| THIN PAPER 2 | OK | OK | OK |
| THIN PAPER 1 | OK | OK | OK |
| PLAIN PAPER 1 | OK | OK | OK |
| PLAIN PAPER 2 | OK | OK | OK |
| PLAIN PAPER 3 | OK | OK | OK |
| THICK PAPER 1 | OK | OK | OK |
| THICK PAPER 2 | OK | OK | OK |
| THICK PAPER 3 | OK | OK | OK |
| THICK PAPER 4 | OK | OK | OK |
| THICK PAPER 5 | OK | OK | OK |
| THICK PAPER 6 | OK | OK | OK |
| THICK PAPER 7 | N/A | N/A | N/A |
| OHP | N/A | N/A | N/A |

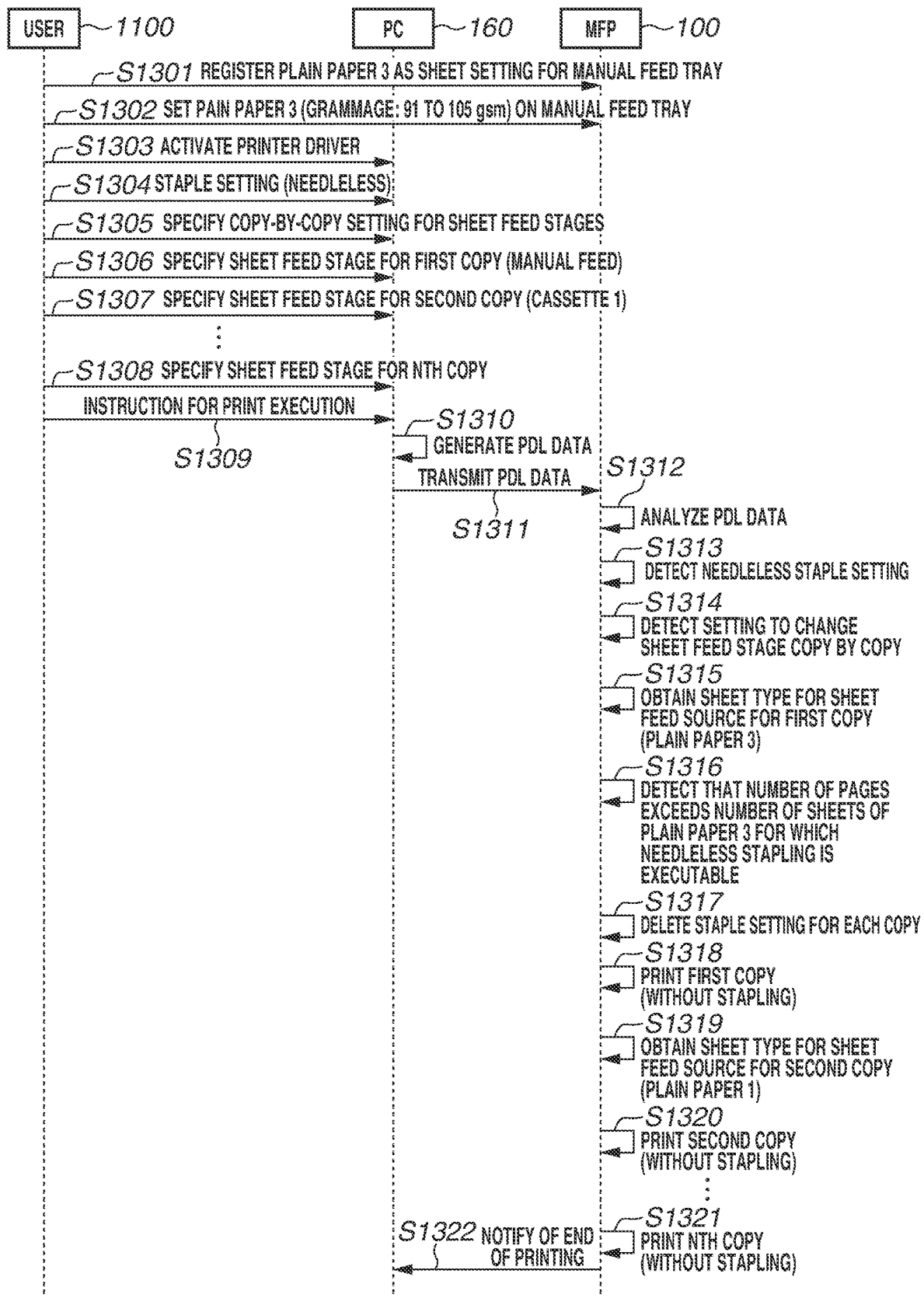

| SHEET TYPE | STAPLE TYPE | | |
| --- | --- | --- | --- |
| | NEEDLE STAPLING | NEEDLELESS STAPLING | SADDLE STAPLING |
| THIN PAPER 2 | 70 SHEETS | 5 SHEETS | 25 SHEETS |
| THIN PAPER 1 | 70 SHEETS | 5 SHEETS | 25 SHEETS |
| PLAIN PAPER 1 | 50 SHEETS | 4 SHEETS | 25 SHEETS |
| PLAIN PAPER 2 | 50 SHEETS | 4 SHEETS | 15 SHEETS |
| PLAIN PAPER 3 | 50 SHEETS | 3 SHEETS | 15 SHEETS |
| THICK PAPER 1 | 30 SHEETS | N/A | N/A |
| THICK PAPER 2 | 30 SHEETS | N/A | N/A |
| THICK PAPER 3 | 30 SHEETS | N/A | N/A |
| THICK PAPER 4 | 30 SHEETS | N/A | N/A |
| THICK PAPER 5 | 30 SHEETS | N/A | N/A |
| THICK PAPER 6 | 30 SHEETS | N/A | N/A |
| THICK PAPER 7 | N/A | N/A | N/A |
| OHP | N/A | N/A | N/A |

IMAGE PROCESSING APPARATUS, METHOD FOR CONTROLLING IMAGE PROCESSING APPARATUS, AND STORAGE MEDIUM

BACKGROUND OF THE INVENTION

Field of the Invention

The present disclosure relates to an image processing apparatus which forms an image on a sheet. The image processing apparatus can be used as an apparatus, such as a copying machine, a printer, and a facsimile apparatus (FAX).

Description of the Related Art

Japanese Patent Application Laid-Open No. 2011-188294 discusses a sub copy print function of switching sheet feed stages copy by copy in printing a plurality of copies of print products. The sub copy print function is a function that causes a printing apparatus to output a plurality of print products including a main copy and a sub copy based on the same print data. In the sub copy print function, for example, a sheet feed stage for feeding sheets for the main copy and a sheet feed stage for feeding sheets for the sub copy can be separately set. Such settings allow the sheet feed stages to be switched between the copies, thus outputting products of the same contents with different types of sheets.

Since the sub copy print function is characteristically used for the purpose of outputting a sub print product, the main print product and the sub copy print product have the same contents except the types of sheets. However, in outputting a print product, some types of processing are applicable and some are not, depending on the type of sheets. The same processing may therefore not always be applicable. For example, staple processing for binding a sheet bundle can be applied to plain paper and thin paper but not some type of thick paper. If a sheet feed stage storing thick paper is specified for a first copy and a sheet feed stage storing plain paper is specified for a second copy, the staple processing is applied not to the first copy but only to the second copy. The first and second copies thus differ in the presence or absence of stapling.

SUMMARY OF THE INVENTION

Applicant's disclosed image forming apparatus works towards suppressing a difference between products due to a difference in sheet type if the products are output with the function of printing a plurality of copies using different sheet feed stages.

According to an aspect of the present invention, an image processing apparatus includes a plurality of sheet storage units including at least a first sheet storage unit and a second sheet storage unit, a post-processing unit configured to perform specific post-processing on a printed sheet, one or more processors, and memory storing instructions that, when executed by the one or more processors, cause the image processing apparatus to perform operations including: receiving a print command in which a sheet in the first sheet storage unit is specified as a sheet to be used in printing a first copy and a sheet in the second sheet storage unit is specified as a sheet to be used in printing a second copy, and outputting, in a case where the specific post-processing is unable to be performed on the sheet to be used in printing the first copy, a printed sheet without causing the post-processing unit to perform the specific post-processing on the sheets for the first and second copies, even if the print command commands that the specific post-processing be performed in printing the first copy and the second copy.

Further features of the present disclosure will become apparent from the following description of embodiments with reference to the attached drawings.

BRIEF DESCRIPTION OF THE DRAWINGS

FIG. 7 is a diagram illustrating a prohibition table for sheet types and staple types.

FIG. 11 is a diagram illustrating a sequence of print processing according to a third embodiment.

FIG. 12 is a diagram illustrating a prohibition table for sheet types and staple types according to the third embodiment.

DESCRIPTION OF THE EMBODIMENTS

Figure 1A:
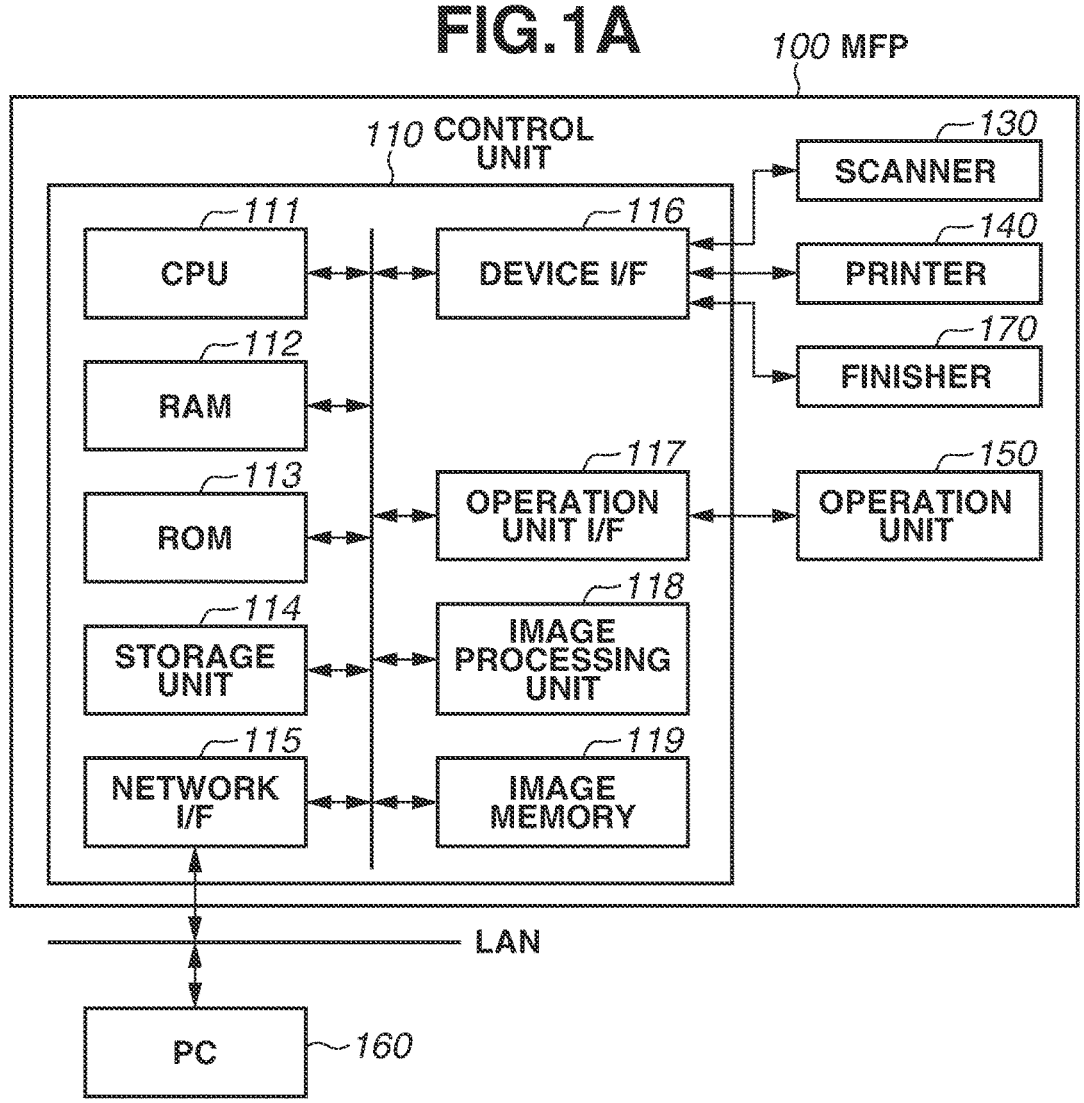
FIG. 1A is a diagram illustrating a hardware configuration of a multi function peripheral (MFP).

Embodiments of the present disclosure will be described in detail below with reference to the accompanying drawings. The following embodiments are not intended to limit the present disclosure set forth in the claims. All combinations of features described in the embodiments are not necessarily essential to the present disclosure. Similar components will be designated by the same reference numerals.

<Description of Multi Function Peripheral (MFP)>

Figure 1B:
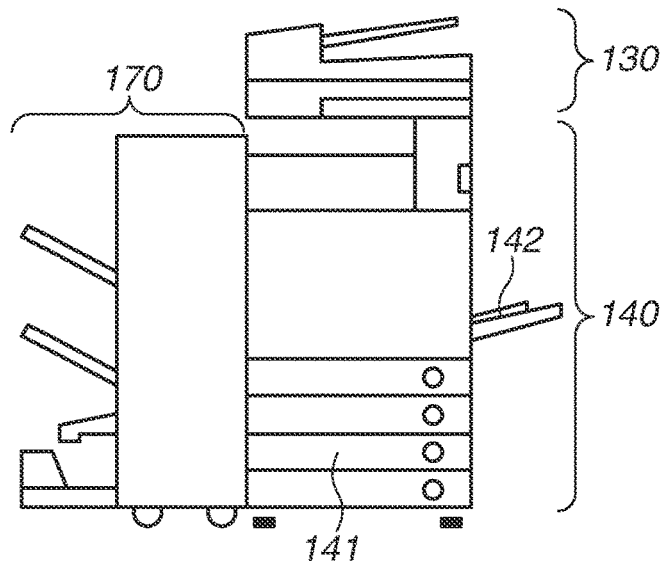
FIG. 1B is a diagram illustrating the appearance of the MFP.

A first embodiment of the present disclosure will be described below in detail. FIGS. 1A and 1B are diagrams each illustrating an MFP 100 which is used as an image processing apparatus in the present embodiment. The MFP 100 is a printing apparatus which forms an image (is able to form an image) on a sheet. The MFP 100 also serves as a print control apparatus which performs print control. More specifically, the MFP 100 is a print control apparatus that can process specific print data for printing a plurality of copies including at least a first copy and a second copy. The first copy is printed by using a sheet in a first sheet feed stage. The second copy is printed by using a sheet in a second sheet feed stage. FIG. 1A is a block diagram of a printing system including the MFP 100. The MFP 100 includes a control unit 110, a scanner 130, a printer 140, a finisher 170, and an operation unit 150. The control unit 110 includes a central processing unit (CPU) 111, a random access memory (RAM) 112, and a read-only memory (ROM) 113. The control unit 110 further includes a storage unit 114, a network interface (I/F) 115, a device I/F 116, an operation unit I/F 117, an image processing unit 118, and an image memory 119.

The control unit 110 is connected to the scanner 130 which is an image input device and the printer 140 which is an image output device, and controls input and output of image information. The control unit 110 is connected to a local area network (LAN), and receives a print job including page description language (PDL) data via the LAN. The control unit 110 analyzes the PDL data and controls image formation. For example, if a sheet specified by the PDL data is not stored in the sheet feed stage specified by the PDL data, the control unit 110 performs control such that image formation is not performed. If the sheet feed stage specified by the PDL data is not capable of storing the sheet specified by the PDL data, the control unit 110 performs control such that image formation is not performed. In the case of not performing image formation, the control unit 110 can display a warning, cancel the print job, and/or permit a change of print settings. Details of the PDL data and details of such controls will be described below.

The CPU 111 controls operation of the MFP 100. The CPU 111 operates based on a program stored in the RAM 112. The ROM 113 is a boot ROM and stores a boot program for the printing system. The storage unit 114 stores system software, image data, and a program for controlling the operation of the MFP 100. The program stored in the storage unit 114 is loaded into the RAM 112. The CPU 111 controls the operation of the MFP 100 based on the program loaded into the RAM 112. The network I/F 115 is connected to the LAN. The network I/F 115 communicates with an external apparatus, such as a personal computer (PC) 160, via the LAN, and governs input and output of various types of information.

The device I/F 116 connects the scanner 130 which is an image input device, the printer 140 which is an image output device, the finisher 170, and the control unit 110, and performs synchronous/asynchronous conversion of image data and device control commands. The operation unit I/F 117 is an I/F for connecting the operation unit 150 to the control unit 110. The operation unit I/F 117 outputs image data to be displayed on the operation unit 150 to the operation unit 150. The operation unit I/F 117 also transmits information input by a user from the operation unit 150 to the CPU 111. The operation unit 150 is a user I/F unit including an input/output inputting and outputting various types of information. The operation unit 150 may include a display unit, and may include a user I/F unit in which the display unit and the input/output unit are integrated.

The image processing unit 118 performs image processing on print data received via the LAN, and performs image processing on image data input to or output from the device I/F 116. The image memory 119 is a memory for temporality loading image data to be processed by the image processing unit 118.

FIG. 1B is an external view of the MFP 100. The MFP 100 includes the scanner 130 which is arranged on the printer 140. The printer 140 includes two types of sheet holding units, including a plurality of cassettes 141 each capable of storing several hundreds of sheets and a manual feed tray 142 on which sheets can be easily replaced. The sheet holding units function as sheet storage units capable of storing sheets to be used in printing. Sizes and types of sheets placed on the cassettes 141 and the manual feed tray 142 are specified and set by the user via an operation screen (not-illustrated), and the information thereabout is stored in the ROM 113 in association with the respective cassettes 141 and the manual feed tray 142. The sizes and types of sheets placed on the cassettes 141 and the manual feed tray 142 may be automatically detected, and the detection results may be configured to be settable. Each of the cassettes 141 and the manual feed tray 142 is also referred to as a sheet feed stage. The printer 140 is connected with the finisher 170. The finisher 170 is a post-processing unit that has a stapling function of performing post-processing, such as needle stapling, needleless stapling, and saddle stapling. Aside from the stapling functions, the finisher 170 may include functions such as a folding function, a punching function, and a bookbinding function. The post-processing such as stapling and punching can be performed copy by copy.

<Description of PC>

Figure 2A:
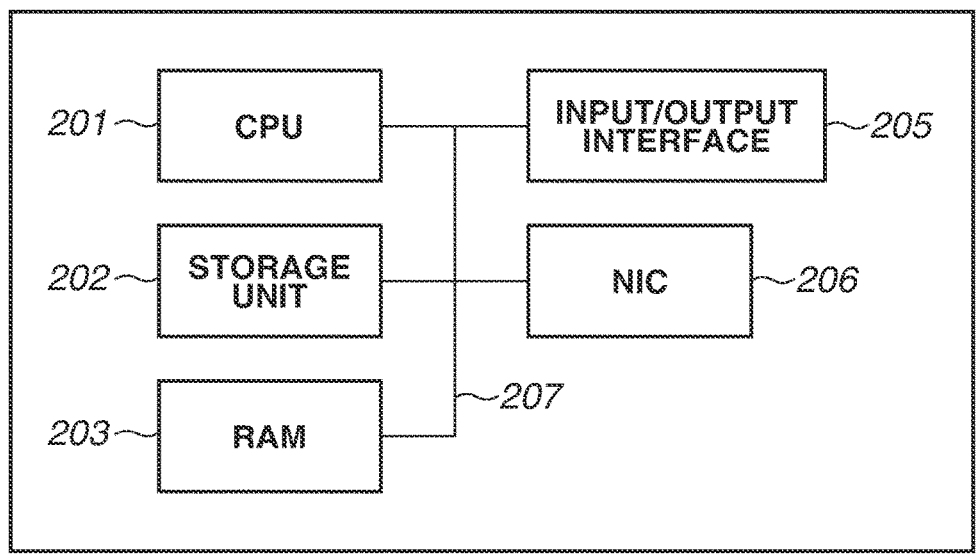
FIG. 2A is a diagram illustrating a hardware configuration of an information processing apparatus.
Figure 2B:
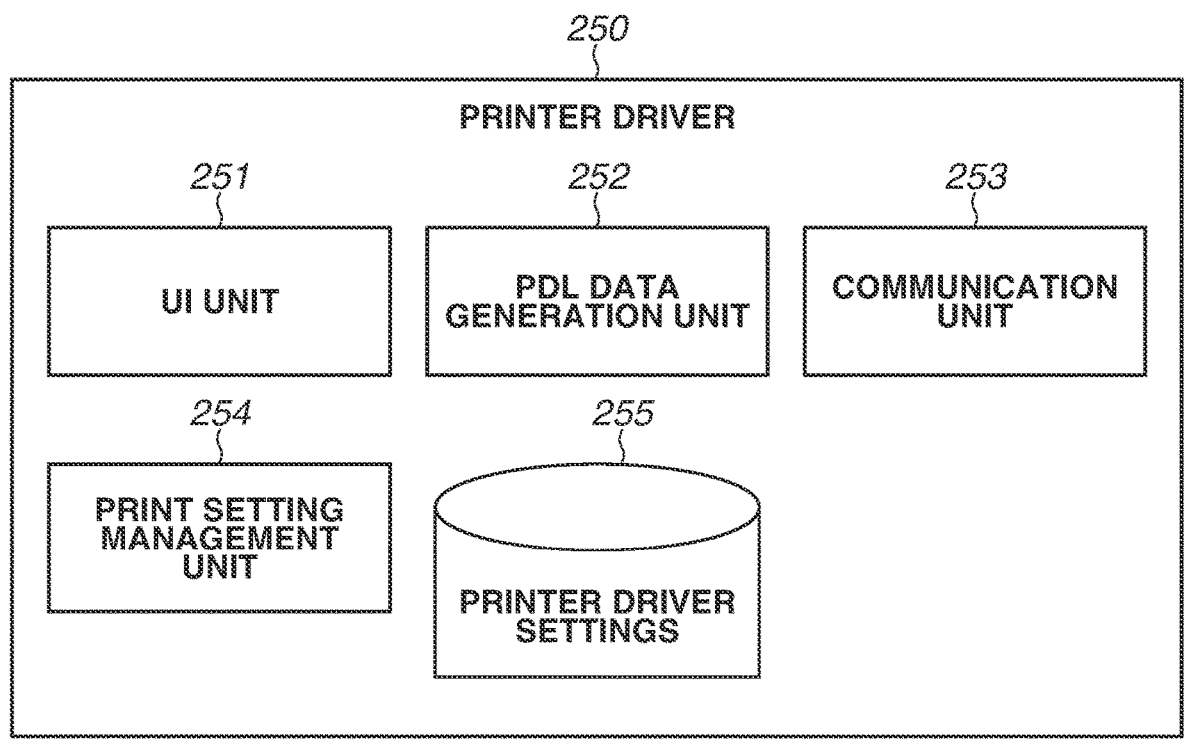
FIG. 2B is a diagram illustrating a software configuration of the information processing apparatus.

FIGS. 2A and 2B are diagrams illustrating the PC 160. The PC 160 is an information processing apparatus which transmits print data to the MFP 100. The PC 160 also serves as a print control apparatus which controls printing of the MFP 100.

FIG. 2A is a diagram illustrating a hardware configuration of the PC 160. The PC 160 includes a CPU 201, a storage unit 202, a RAM 203, an input/output I/F 205, and a network interface card (NIC) 206. The CPU 201 is a unit that executes various programs and implements various functions. The storage unit 202 stores various programs and setting data. The CPU 201 loads the programs stored in the storage unit 202 into the RAM 202 and executes the programs. The RAM 203 is a unit that is also used as a temporary working memory area of the CPU 201. The input/output I/F 205 transmits data to various devices and a display (not illustrated) connected to the PC 160, and receives data from a pointing device (not illustrated). The NIC 206 is a unit for connecting the PC 160 to a network. The above-mentioned units can transmit and receive data via a bus 207.

FIG. 2B is a diagram illustrating a configuration of software running on the PC 160. Specifically, FIG. 2B illustrates a configuration of a printer driver 250 which performs print control of the MFP 100. Software programs for implementing the printer driver 250 are stored in the storage unit 202. The printer driver 250 has the function of communicating with the MFP 100 and transmitting a print job including PDL data generated on the PC 160 to the MFP 100 in response to a request from a not-illustrated application.

The printer driver 250 includes a user interface (UI) unit 251, a PDL data generation unit 252, a communication unit 253, and a print setting management unit 254. The UI unit 251 provides a UI related to print settings of the printer driver 250. For example, the UI unit 251 displays a UI screen on the display (not illustrated). The PDL data generation unit 252 generates PDL data according to specified print settings. The communication unit 253 performs network communication with the MFP 100 by using the NIC 206. The print setting management unit 254 presents a print setting screen to the user via the UI unit 251, and manages print setting information about print execution. The print setting information is stored in the storage unit 202.

<UI Screen When Making Print Settings of Printer Driver>

Figure 3A:
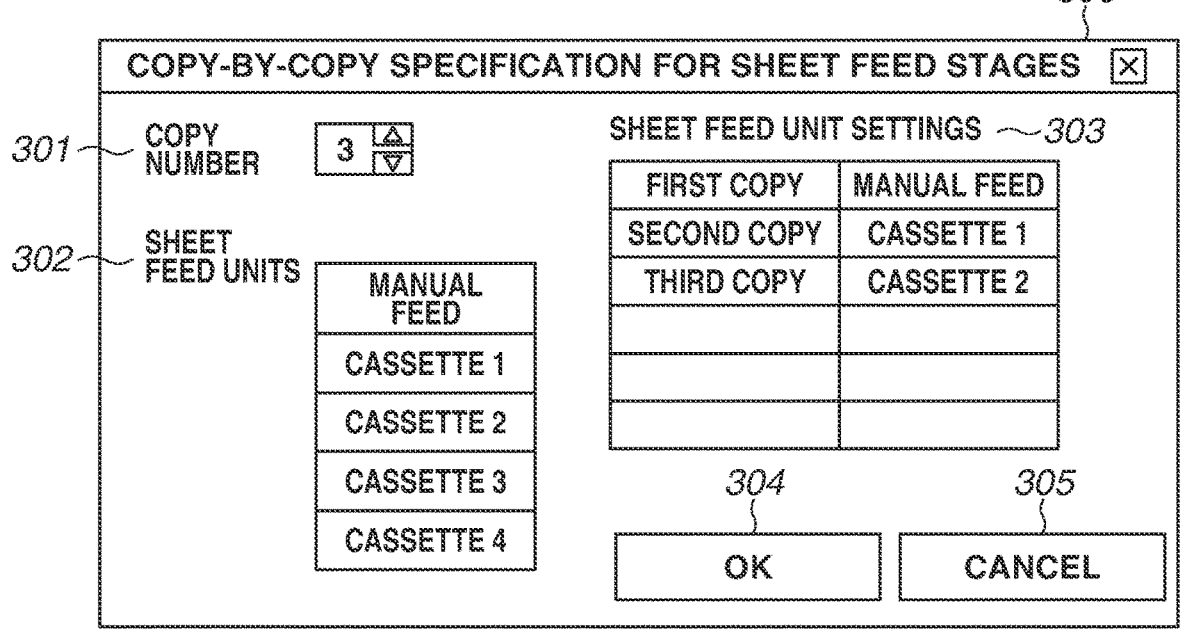
FIG. 3A is a diagram illustrating a setting screen (sheet feed stage specification) of a printer driver.
Figure 3B:
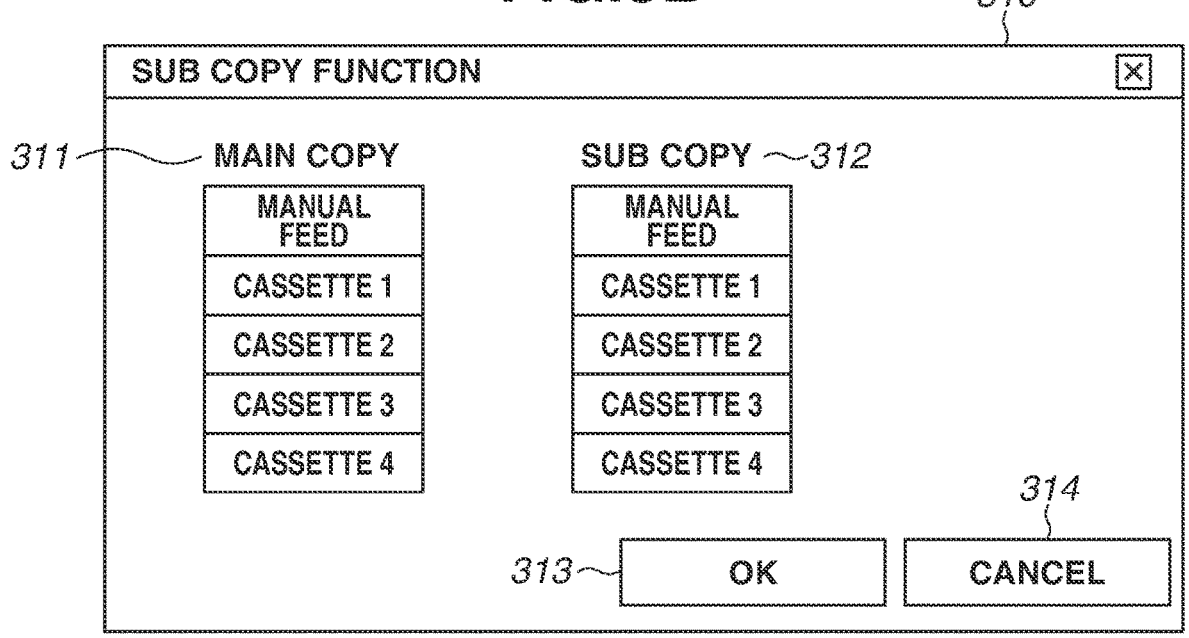
FIG. 3B is a diagram illustrating a setting screen (sub copy print function) of the printer driver.

In this embodiment, the printer driver 250 has the function of instructing a printing apparatus to output a plurality of print products including a main copy and a sub copy based on the same print data. For example, the printer driver 250 instructs the MFP 100 to output, as the main copy for a customer, a coated paper on which the print data is printed, and, as the sub copy for a private duplicate, a recycled paper on which the same print data is printed. FIGS. 3A and 3B are diagrams illustrating UI screen examples of the printer driver 250 for making settings to switch sheet feed stages (may also be referred to as sheet feed units, sheet feed trays, or sheet feed sources) to feed sheet copy by copy. FIG. 3A illustrates a UI screen example in which the number of copies is set and sheet feed stages are selected copy by copy. FIG. 3B illustrates a UI screen example in which a main copy is differentiated from a sub copy and sheet feed stages are switched between the main copy and the sub copy. In the present embodiment, the sheet feed stages for the respective copies may be set in either of the modes illustrated in FIGS. 3A and 3B. A group in which a document to be printed is printed will hereinafter be referred to as a "copy". A group in which a document to be printed is printed may be referred to as a "set". For example, printing two copies of a document may be referred to as printing two sets. To identify each copy in a specific manner, a notation such as an Xth copy (X is a natural number) is used, for example, a first copy and a second copy. A notation such as an Xth set may be used, for example, a first set and a second set.

FIG. 3A illustrates a UI screen 300 which includes a copy number selection field 301, a sheet feed stage selection field 302, a sheet feed stage setting list 303, an OK button 304, and a cancel button 305. The UI screen 300 is displayed if printing of three copies and switching of sheet feed stages copy by copy is specified via a UI screen (not illustrated). The user can make settings to switch sheet feed stages via the UI screen 300. The copy number selection field 301 is a field for selecting the copy for which a sheet feed stage is selected. The UI screen 300 illustrates an example where a sheet feed stage for the third copy is selected to be set. The sheet feed stage selection field 302 is a field for selecting from which sheet feed stage sheets is fed in printing the copy selected in the copy number selection field 301. The sheet feed stage selection field 302 lists the sheet feed units included in the MFP 100 that performs the print processing. The user can select a desired sheet feed stage via the UI screen 300. The sheet feed stage setting list 303 is an area for listing the copy-by-copy settings of the sheet feed stages, made via the copy number selection field 301 and the sheet feed stage selection field 302. If the user presses the OK button 504 with items having been set in the sheet feed stage setting list 303, the printer driver 250 stores the setting information. If the cancel button 505 is pressed, the printer driver 250 discards the setting information. If the number of sheet feed stages for which settings are made via the UI screen 300 is smaller than the number of copies to be printed that is set by a copy number setting unit specified via the not-illustrated UI screen, the printer driver 250 may set the last sheet feed stage set in the sheet feed stage setting list 303 as the sheet feed stage(s) for the remaining copy or copies.

FIG. 3B illustrates a UI screen 310 which includes a main copy sheet feed stage selection field 311, a sub copy sheet feed stage selection field 312, an OK button 313, and a cancel button 314. The UI screen 310 is displayed if switching of sheet feed stages copy by copy is specified via a not-illustrated UI screen. The main copy sheet feed stage selection field 311 is a field for selecting the sheet feed stage to be used for a main copy. The sub copy sheet feed stage selection field 312 is used for selecting the sheet feed stage to be used for a sub copy. The sheet feed stage selected in the main copy sheet feed stage selection field 311 is not selectable in the sub copy sheet feed stage selection held 312. The sub copy sheet feed stage selection field 312 may allow multiple selections. If the OK button 504 is pressed with respective sheet feed stages having been selected, the printer driver 250 stores the setting information. If the cancel button 505 is pressed, the printer driver 250 discards the setting information.

<Description of PDL Data>

Figure 4:
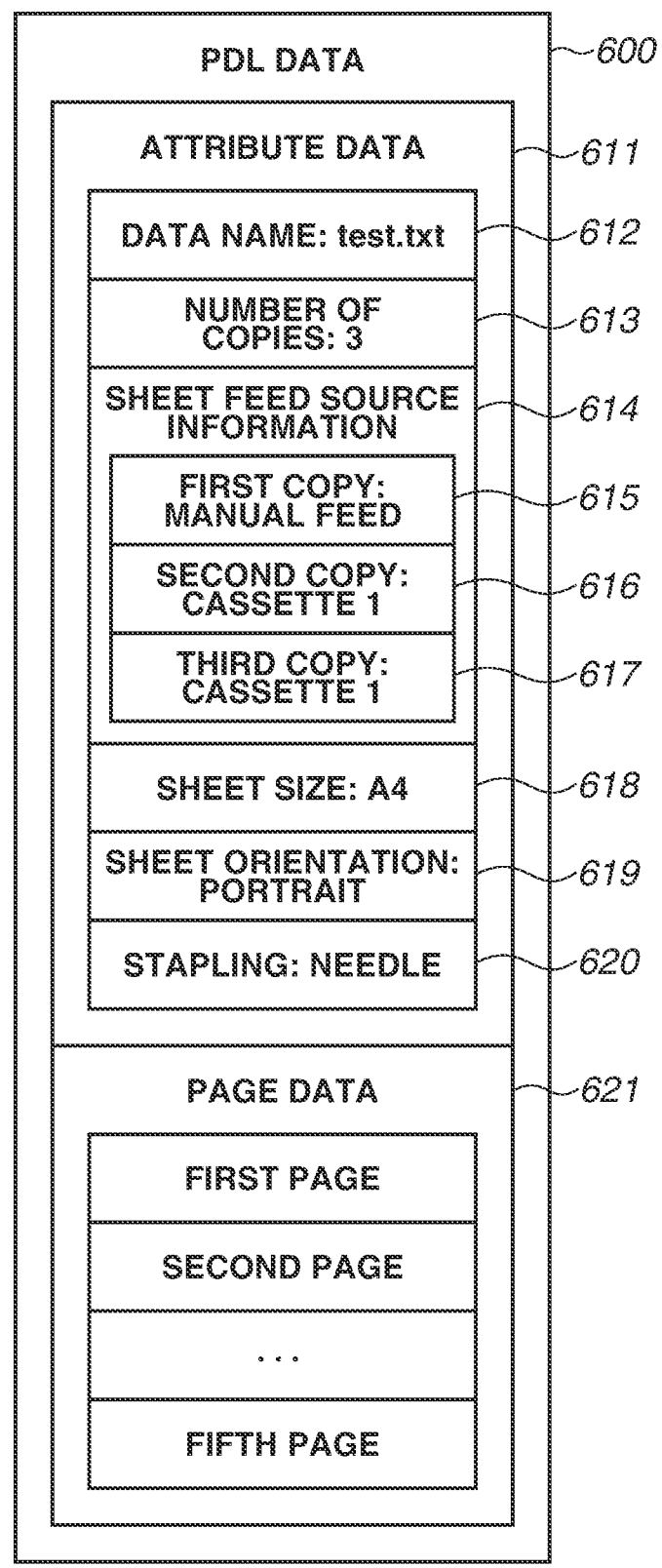
FIG. 4 is a diagram illustrating a configuration of page description language (PDL) data.

FIG. 4 is a diagram illustrating a specific example of PDL data in the case where the sheet feed stage from which sheets are fed is switched copy by copy. PDL data 600 is generated as a print job by the printer driver 250 and transmitted to the MFP 100. The information about the sheet feed stages for the respective copies, described in FIG. 3A or 3B, is included in the PDL data 600 and transmitted to the MFP 100.

As illustrated in FIG. 4, the PDL data 600 includes attribute data 611 and page data 621. The attribute data 611 includes various types of information including a data name 612, a number of copies 613, sheet feed source information 614, a sheet size 618, sheet orientation 619, and stapling 620. The data name 612 is a name for identifying the PDL data 600. The data name 612 is provided based on, for example, the filename of application data from which the PDL data 600 derives. The number of copies 613 is information indicating the number of copies to be printed. In the PDL data 600, test.txt is set as the data name 612 of the attribute data 611, and 3 as the number of copies 613. For the sheet feed source information 614, manual feed is set for a first copy 615, cassette 1 for a second copy 616, and cassette 1 for a third copy 617. Since the PDL data 600 includes a plurality of pieces of sheet feed source information, the MFP 100 performs processing for switching sheet feed stages copy by copy. A4 is set for the sheet size 618, portrait for the sheet orientation 619, and needle stapling for the stapling 620. The PDL data 600 includes no setting about sheet types. The page data 621 includes data corresponding to five pages. The number of pages included in the PDL data 600 can be obtained by referring to the page data 621.

<Processing Sequence of Printing System According to Present Embodiment>

Figure 5:
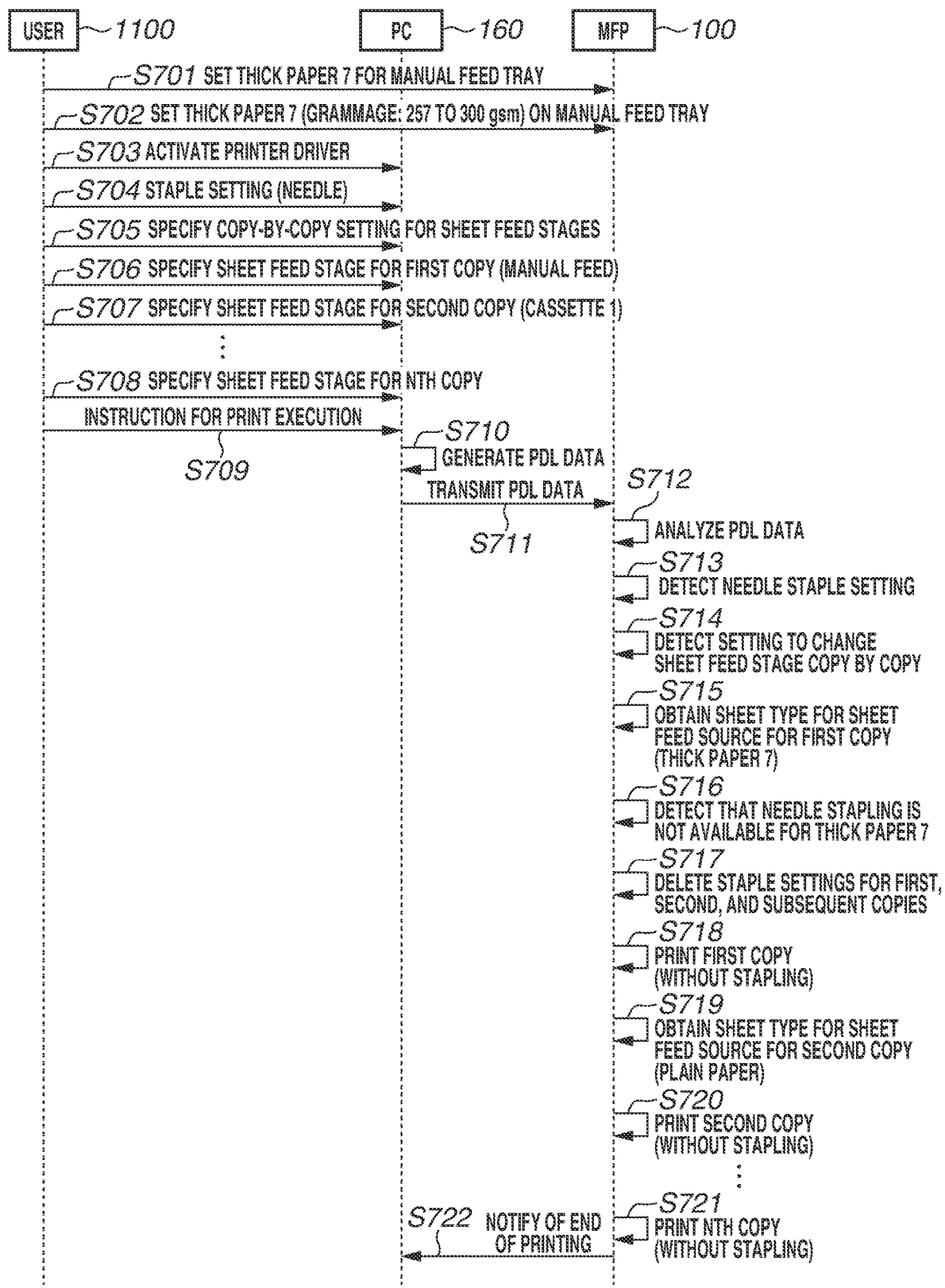
FIG. 5 is a diagram illustrating a sequence of print processing according to a first embodiment.

FIG. 5 is a diagram illustrating a sequence for describing print processing performed by the printing system in the case where a setting to change the sheet feed stage copy by copy is made. FIG. 5 is a sequence diagram in which a user 1100 operates the printer driver 250 on the PC 160 and the MFP 100 completes printing.

In step S701, the user 1100 makes a sheet setting of the manual feed tray 142 via the operation unit 150 of the MFP 100 to set thick paper 7 (with a grammage of 257 to 300 Grams per Square Meter (gsm)) for the manual feed tray 142. In step S702, the user 1100 sets a needed number of sheets of thick paper 7 on the manual feed tray 142 of the MFP 100.

In step S703, the user 1100 activates the printer driver 250 on the PC 160. The user 1100 then makes various print settings. The print settings made by the user 1100 may include specifications for a sheet size and sheet types. In step S705, the user 1100 specifies copy-by-copy setting of sheet feed stages via a not-illustrated UI screen. Then, for example, the UI screen 300 of the printer driver 250 illustrated in FIG. 3A is displayed. In steps S705 to S708, the user 1100 specifies the sheet feed stages copy by copy, and the printer driver 250 stores the settings. In step S709, the user 1100 inputs, into the printer driver 250 of the PC 160, an instruction to cause the MFP 100 to execute printing.

In step S710, the printer driver 250 generates, for example, the PDL data 600 illustrated in FIG. 4 based on the print settings specified by the user 1100. In step S711, the printer driver 250 transmits the generated PDL data 600 to the MFP 100.

In step S712, the MFP 100 receives the PDL data 600 and analyzes the received PDL data 600. In step S713, the MFP 100 detects from the analysis of the PDL data 600 that a needle staple setting has been set. In step S714, the MFP 100 detects from the analysis of the PDL data 600 that a setting to change the sheet feed stage copy by copy has been set.

In step S715, the MFP 100 detects from the analysis of the PDL data 600 that the manual feed tray 142 is set as the sheet feed source for the first copy. The MFP 100 then obtains the sheet type set for the manual feed tray 142 (manual sheet feed stage), and obtains the setting of thick paper 7 for the manual sheet feed stage. In step S716, the MFP 100 refers to a prohibition table 900 of sheet types and staple types, described below in FIG. 7, and detects that needle stapling is not available for the thick paper 7. In step S717, the MFP 100 deletes the staple settings for the first copy which is the main copy and for the second and subsequent copies which are sub copies, based on the detection result of step S716.

In step S718, the MFP 100 performs print control based on the analyzed PDL data 600. More specifically, the MFP 100 feeds sheets from the sheet feed stage set for the first copy in the PDL data 600, and prints the first copy. Since the staple setting is deleted in step S717, needle stapling is not performed here. As illustrated in steps S719, S720, and S721, the MFP 100 obtains the sheet types set for the sheet feed sources of the second to Nth copies set in the PDL data 600 and repeatedly performs printing. As in the first copy, needle stapling is not performed here since the staple settings are deleted in step S717. In step S722, after the completion of printing of all the copies, the MFP 100 notifies the PC 160 of the end of printing.

Figure 6A:
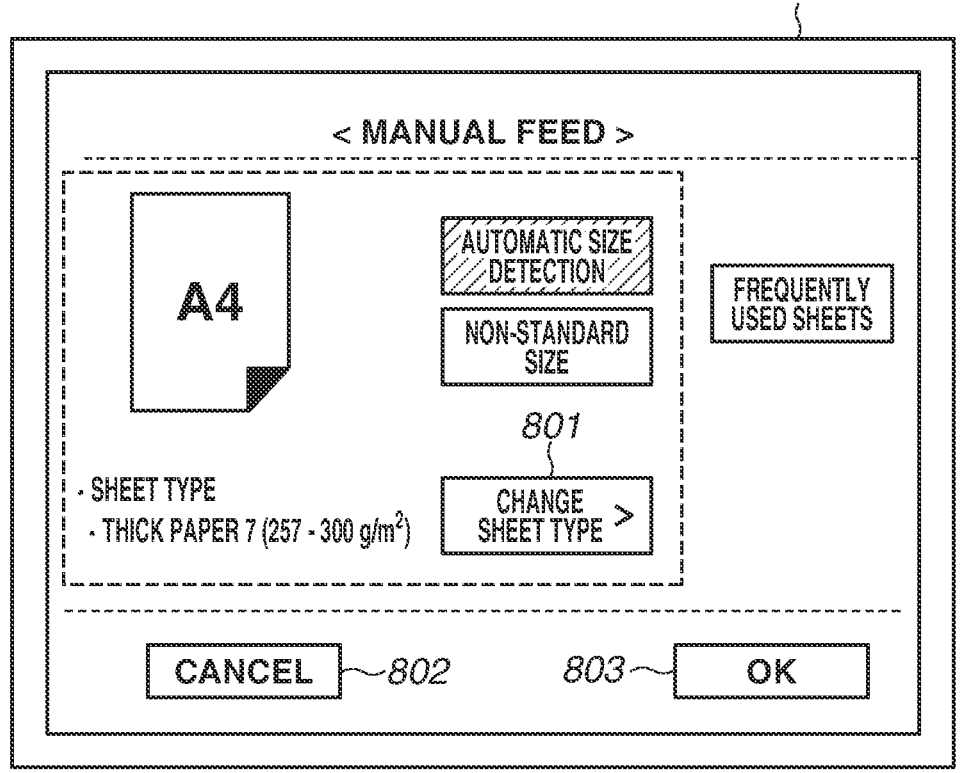
FIG. 6A is a diagram illustrating a setting screen (sheet setting for a manual sheet feed stage) of the MFP.
Figure 6B:
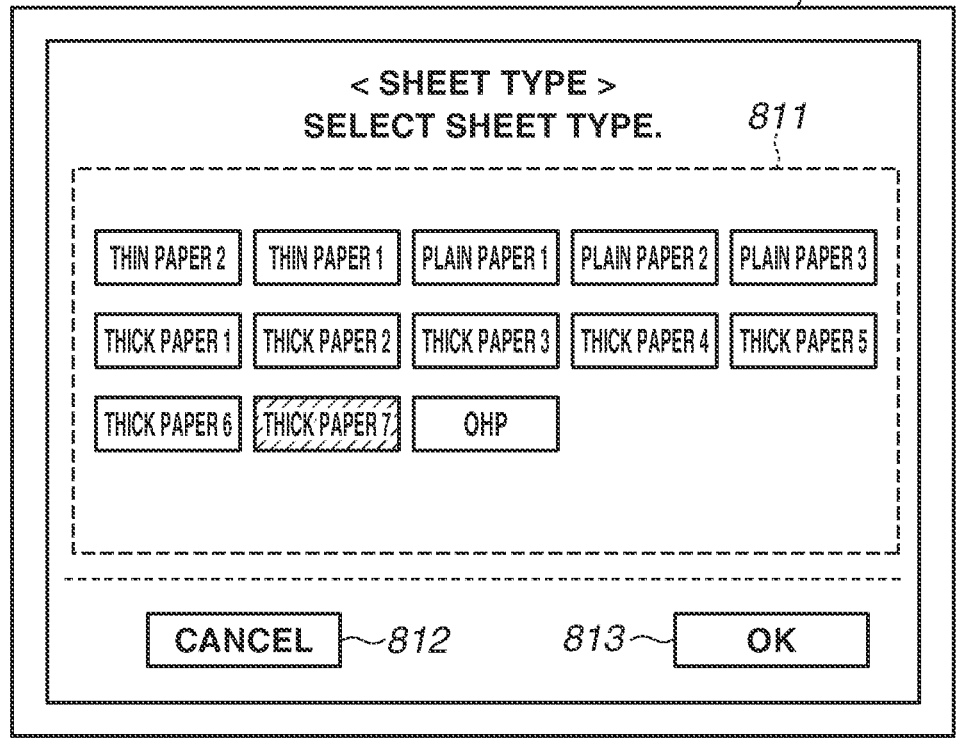
FIG. 6B is a diagram illustrating a setting screen (sheet type selection) of the MFP.

FIGS. 6A and 6B illustrate examples of a screen for making the sheet settings of the sheet feed stages, or sheet feed sources, via the operation unit 150 of the MFP 100. A screen 800 is a screen for making a sheet setting for the manual sheet feed stage. On the screen 800, automatic size detection is set and A4 is currently detected. The sheet type is set to thick paper 7 (with a grammage of 257 to 300 gsm). The sheet type can be changed on a screen 810 by a sheet type change button 801 being pressed. A cancel button 802 is pressed to quit sheet setting for the manual sheet feed stage. If an OK button 803 is pressed, the sheet setting for the manual sheet feed stage, made on the screen 800, is stored into the storage unit 114 of the MFP 100. The screen 810 is a screen for specifying the sheet type to be set on the screen 800. If a sheet type is selected from a field 811 and an OK button 813 is pressed, the selected sheet type is reflected on the sheet type on the screen 800. If a cancel button 812 is pressed, the change in the field 811 is discarded and the sheet type on the screen 800 is not updated.

FIG. 7 is a diagram illustrating an example of the prohibition table 900 for sheet types and staple types, stored in the MFP 100. The prohibition table 900 indicates that needle stapling, needleless stapling, and saddle stapling are not able to be performed for thick paper 7 and overhead projector (OHP) sheets.

<Flowchart of MFP>

Figure 8:
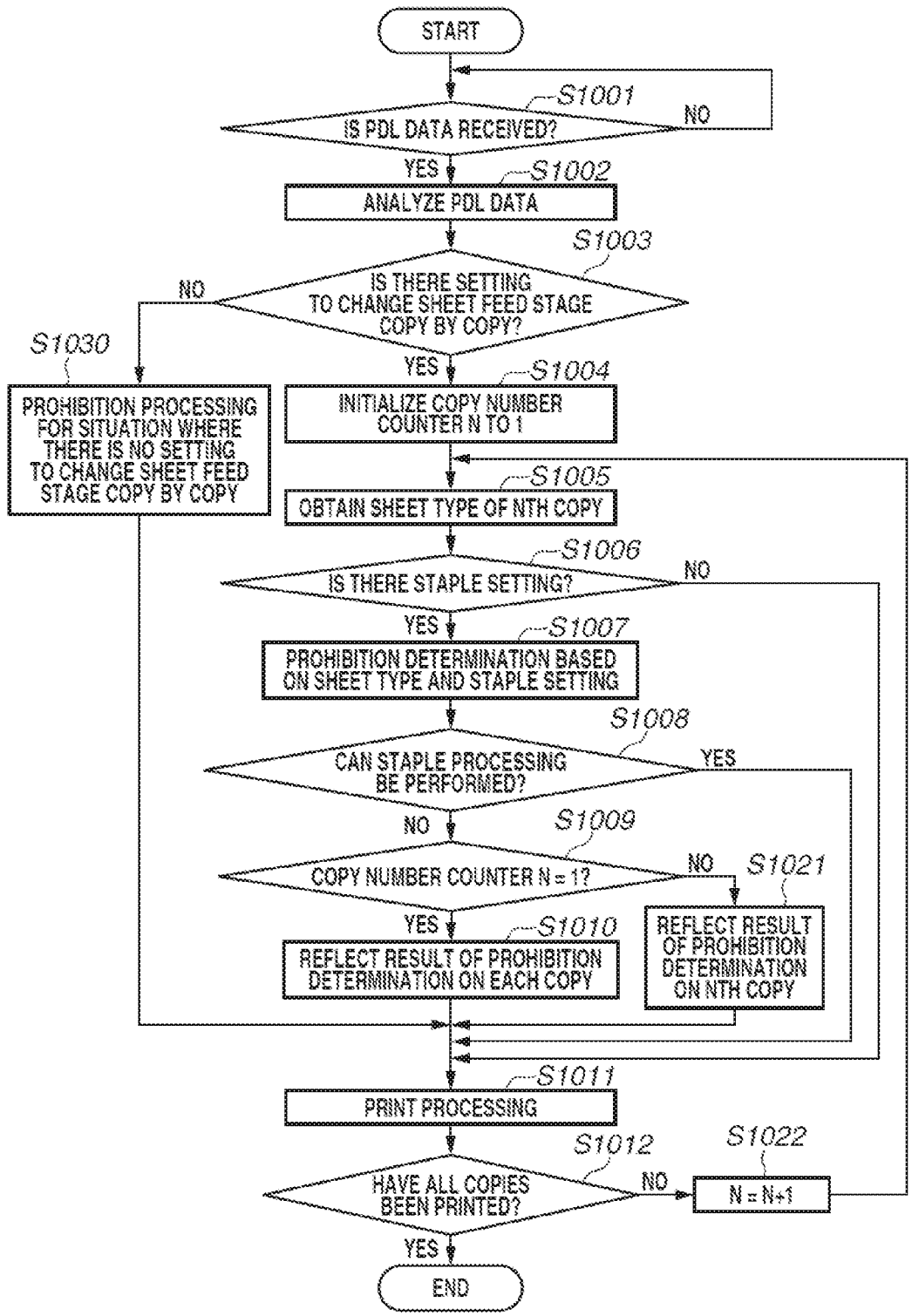
FIG. 8 is a flowchart of the print processing.

FIG. 8 is a flowchart illustrating details of steps S712 to S721 in FIG. 5. The following description will be provided using a case where the MFP 100 receives the PDL data 600 (print job) of FIG. 4 as an example. The flowchart relates to the execution of a print job in which sheet feed stages are switched copy by copy, and is implemented by the control unit 110 causing the CPU 111 to execute a program stored in the ROM 113.

In step S1001, the control unit 110 determines whether the PDL data 600 is received. If the PDL data 600 is received (YES in step S1001), the processing proceeds to step S1002. If the PDL data 600 is not received (NO in step S1001), the processing returns to step S1001. In other words, the processing of step S1002 and subsequent steps is not performed until the PDL data 600 is received. In step S1002, the control unit 110 analyzes the received PDL data 600. The control unit 110 then obtains various pieces of information, such as the sheet feed source information 614, the sheet size 618, and the sheet orientation 619, from the attribute data 611 of the PDL data 600.

In step S1003, the control unit 110 determines whether there is a setting to change the sheet feed stage copy by copy. If there is a setting to change the sheet feed stage copy by copy (YES in step S1003), the processing proceeds to step S1004. If the control unit 110 determines that there is no setting to change the sheet feed stage copy by copy (NO in step S1003), the processing proceeds to step S1030. The determination processing in step S1003 can be performed depending on whether setting information about a plurality of sheet feed stages is stored as items of the sheet feed source information 614 included in the received PDL data 600. In other words, if setting information about a plurality of sheet feed stages is stored as items of the sheet feed source information 614, the control unit 110 determines that there is a setting to change the sheet feed stage copy by copy. If setting information about a plurality of sheet feed stages is not stored as items of the sheet feed source information 614, the control unit 110 determines that there is no setting to change the sheet feed stage copy by copy.

In step S1030, the control unit 110 makes a prohibition determination by referring to the prohibition table 900 for the situation where there is no setting to change the sheet feed stage copy by copy. If the print settings include an inexecutable combination, the control unit 110 changes the print settings not to execute the stapling.

In step S1004, the control unit 110 initializes a copy number counter N to 1. In step S1005, the control unit 110 obtains the sheet feed source information about the Nth copy, and obtains the sheet type set for the corresponding sheet feed stage from the sheet feed source information. In step S1006, the control unit 110 determines from the attribute data 611 included in the received PDL data 600 whether there is a staple setting. If the control unit 110 determines that there is no staple setting (NO in step S1006), the processing proceeds to step S1011. If the control unit 110 determines that there is a staple setting (YES in step S1006), the processing proceeds to step S1007. In step S1007, the control unit 110 refers to the prohibition table 900 of FIG. 7 and determines (makes a prohibition determination) whether the set staple processing can be performed based on the sheet type obtained in step S1005 and the staple setting determined in step S1006. For example, if the thick paper 7 and needle stapling are set, the control unit 110 determines from the prohibition table 900 of FIG. 7 that the staple processing is unable to be performed. In step S1008, if the staple processing is determined to be unable to be performed (NO in step S1008), the processing proceeds to step S1009. If the staple processing is determined to be able to be performed (YES in step S1008), the processing proceeds to step S1011.

In step S1009, the control unit 110 determines whether the copy number counter N is one. If the copy number counter N is determined to be one (YES in step S1009), the processing proceeds to step S1010. If the copy number counter N is determined not to be one (NO in step S1009), the processing proceeds to step S1021. In step S1021, the control unit 110 reflects the result of the prohibition determination in step S1007 on the Nth copy, whereby the staple setting of the Nth copy is deleted.

In step S1010, i.e., if the copy number counter N is 1, the control unit 110 reflects the result of the prohibition determination in step S1007 not only on the first, original copy but on each of the first to Nth copies, whereby the staple setting for each copy is deleted. The purpose is to make the sub products conform to the main product even in terms of stapling.

In step S1011, the control unit 110 feeds sheets from the sheet feed stage specified for the Nth copy and performs print processing using the page data 621 (image data) included in the PDL data 600. For example, the control unit 110 performs image rotation processing based on the sheet orientation 619, switches fixing conditions based on the sheet type, and prints images on the sheets.

In step S1012, the control unit 110 compares the number of copies 613 set in the PDL data 600 with the copy number counter N, and determines whether all the copies have been printed. If all the copies have been printed (YES in step S1012), the processing ends. If all the copies have not been printed (NO in step S1012), the processing proceeds to step S1022. In step S1022, the control unit 110 adds 1 to N. The processing returns to and repeats from step S1005.

The processing of FIGS. 5 and 8 described above is based on the PDL data 600 in which sheet feed stages are specified copy by copy as illustrated in FIG. 3A. Similar processing is performed with PDL data in which intended use types for differentiating a main copy from a sub copy are specified as illustrated in FIG. 3B. For example, in the case of switching sheet feed stages to feed sheets copy by copy, a sheet feed stage attribute is attached to each copy as the sheet feed source information 614. In step S1003, the control unit 110 may determine whether there is a setting to change the sheet feed stage copy by copy, based on whether a sheet feed stage attribute is attached to each copy. An attribute for setting as to whether to turn on/off a change of the sheet feed stage may be added to the attribute data 611, and the control 110 may make the determination based on the setting. The control unit 110 may use a main copy as the first copy, and sub copies as the subsequent copies. The control unit 110 may be configured to cancel the print job and end the processing in step S1010 instead of deleting the staple setting for each copy.

As has been described, in the present embodiment, if the sheet type set for the sheet feed stage specified for the first copy which is the main copy and the staple setting specified as a print setting are not executable in combination, the control unit 110 performs the following processing. The control unit 110 deletes the staple settings for not only the main copy but for each of the sub copies as well, and performs printing. Such control can prevent the staple setting, which is not to be applied to the main copy, from being applied to the sub products during execution of the sub copy print function. In the first embodiment, the sub copy print function is a function that causes a printing apparatus to output a plurality of print products including a main copy and a sub copy based on the same print data. A type of sheet used in an execution of the sub copy print function is not limited to a carbon paper, and any type of paper can be used. The explanation for the sub copy print function described above applies to other embodiments described below.

A second embodiment of the present disclosure will be described below in detail. In the first embodiment, the sheet type of the first copy, the main copy, and the staple setting are not executable in combination. In the present embodiment, a case is described where the sheet type of a sub copy, second or subsequent copy, and the staple setting are not executable in combination.

<Processing Sequence of Printing System According to Second Embodiment>

Figure 9:
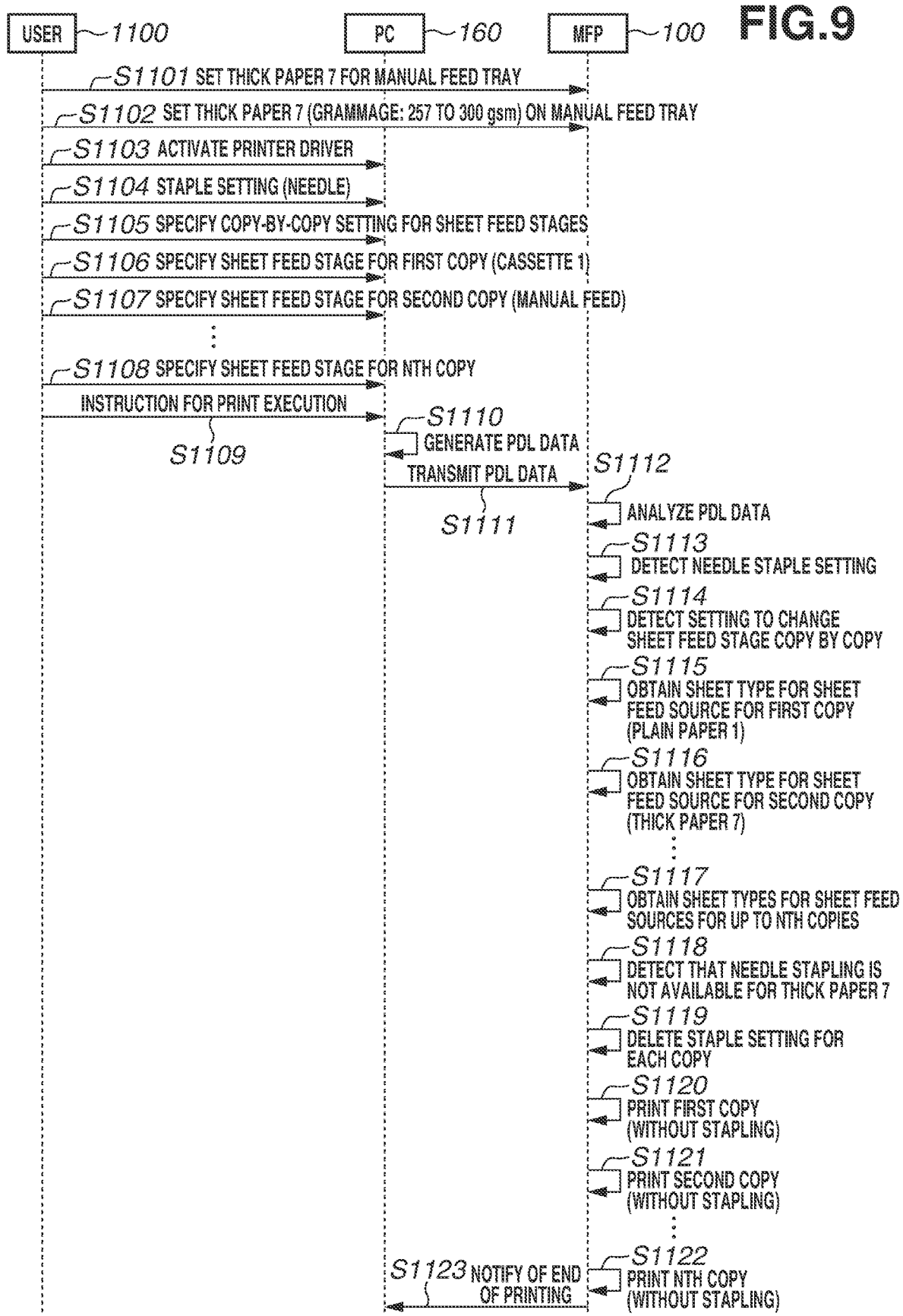
FIG. 9 is a diagram illustrating a sequence of print processing according to a second embodiment.

FIG. 9 is a diagram illustrating a sequence of print processing performed in a printing system according to the present embodiment in a case where a setting to change the sheet feed stage copy by copy is made.

Steps S1101 to S1115 are similar to the processing illustrated in steps S701 to S715 of FIG. 5. However, there are differences in that the cassette 1 is set as the sheet feed stage for the first copy, and the manual feed tray 142 is specified as the sheet feed source for the second copy.

In steps S1116 and S1117, the control unit 110 obtains the sheet types set for the respective sheet feed stages from the sheet feed source information set for the second and subsequent copies. In step S1118, the control unit 110 refers to the prohibition table 900 of FIG. 7 and determines whether there is an in executable combination of a sheet type and a staple setting among those set for the sheet feed stages for the respective copies. As a result of the determination, the control unit 110 detects that needle stapling is not available for thick paper 7 to be used for the second copy.

In step S1119, the control unit 110 deletes the respective staple settings for the first to nth copies.

In steps S1120 to S1122, the control unit 110 prints the respective copies without needle stapling.

<Flowchart of MFP>

Figure 10:
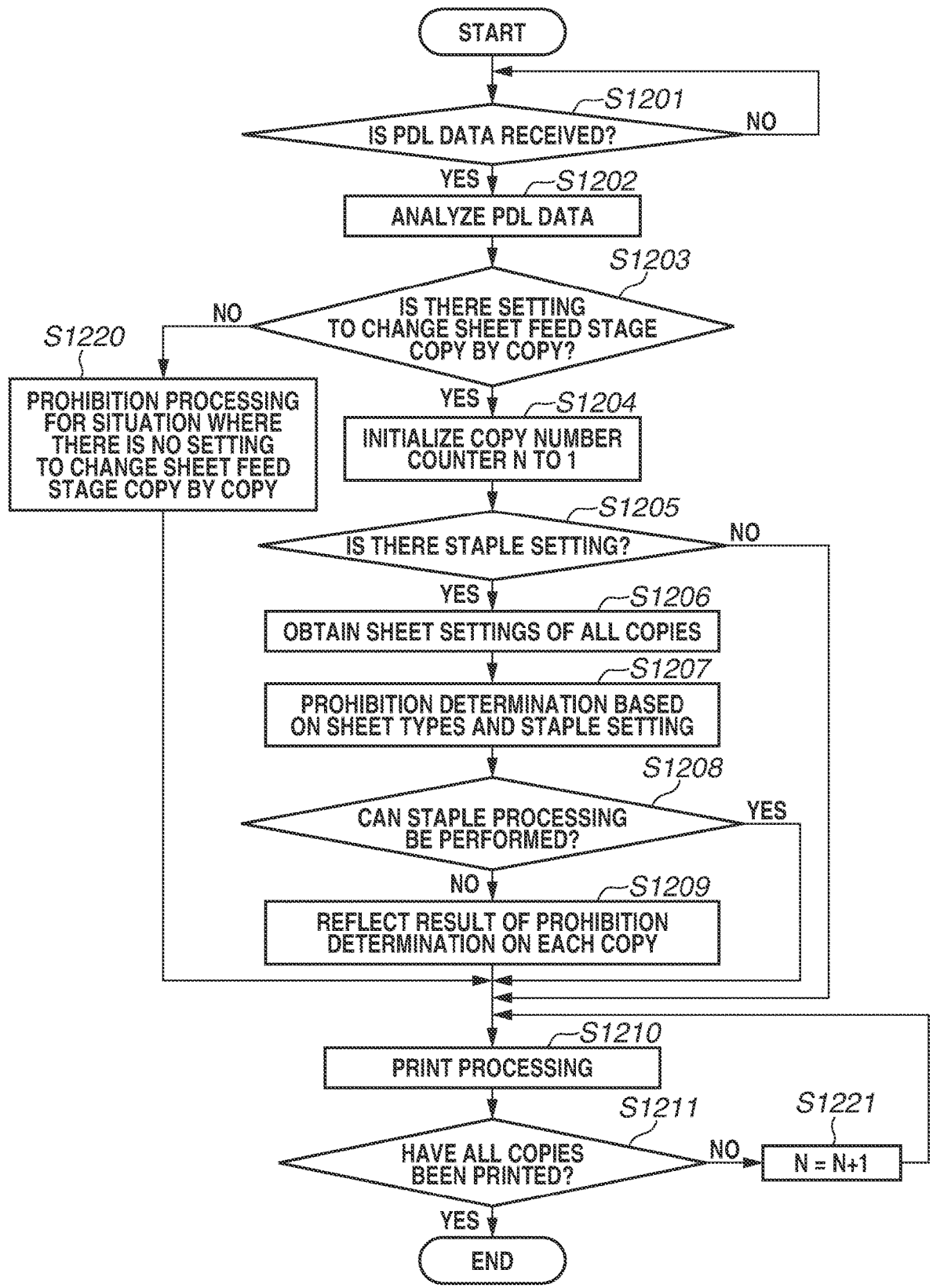
FIG. 10 is a flowchart of the print processing according to the second embodiment.

FIG. 10 is a flowchart illustrating details of steps S1112 to S1122 in FIG. 9. The following description will be given by using an example where the MFP 100 receives the PDL data 600 (print job) of FIG. 4 as an example. The flowchart relates to the execution of a print job in which sheet feed stages are switched copy by copy, and is implemented by the control unit 110 causing the CPU 111 to execute a program stored in the ROM 113. A description of processing similar to that of the first embodiment is omitted, and only differences will be described.

In step S1205, the control unit 110 determines from the attribute data 611 included in the received PDL data 600 whether there is a staple setting. If the control unit 110 determines that there is no staple setting (NO in step S1205), the processing proceeds to step S1210. If the control unit 110 determines that there is a staple setting (YES in step S1205), the processing proceeds to step S1206. In step S1206, the control unit 110 reads the sheet feed source information 614 about all the copies, and obtains the sheet settings set for the respective sheet feed stages. In step S1207, the control unit 110 refers to the prohibition table 900 of FIG. 7 and determines whether the set staple processing can be performed based on the sheet types obtained in step S1206 and the staple setting determined in step S1205. For example, if the thick paper 7 and needle stapling have been set, the control unit 110 determines from the prohibition table 900 of FIG. 7 that the staple processing is unable to be performed. In step S1208, if the staple processing is determined to be unable to be performed (NO in step S1208), the processing proceeds to step S1209. If the staple processing is determined to be able to be performed (YES in step S1208), the processing proceeds to step S1210.

In step S1209, the control unit 110 reflects the result of the prohibition determination in step S1207 on each copy, whereby the staple setting for each copy is deleted.

In step S1210, the control unit 110 feeds sheets from the sheet feed stage specified for the Nth copy and performs print processing using the page data 621 (image data) included in the PDL data 600. For example, the control unit 110 performs image rotation processing according to the sheet orientation 619, switches fixing conditions according to the sheet type, and prints images on the sheets.

In step S1211, the control unit 110 compares the number of copies 613 set in the PDL data 600 with the copy number counter N, and determines whether all the copies have been printed. If all the copies have been printed (YES in step S1211), the processing ends. If all the copies have not been printed (NO in step S1211), the processing proceeds to step S1221. In step S1221, the control unit 110 adds one to N. The processing returns to and repeats from step S1210.

As has been described, in the present embodiment, in a case where the sheet type set for the sheet feed stage specified for the second or a subsequent copy, which is a sub copy, and the staple setting specified as a print setting are not executable in combination, the control unit 110 performs the following processing. The control unit 110 deletes the staple settings for not only the copy in question but for all the copies including the main copy, and performs printing. Such control allows the staple setting not applied to a sub copy to be prevented from being reflected on the main copy and the other sub products during execution of the sub copy print function.

A third embodiment of the present disclosure will be described below in detail. In the first and second embodiments, the prohibition table 900 for sheet types and stapling types is described only in a case where respective combinations are executable or not. In the present embodiment, a case is described where the number of sheets for which stapling is executable varies depending on the sheet type.

<Processing Sequence of Printing System According to Third Embodiment>

FIG. 11 is a diagram illustrating a sequence for print processing performed in a printing system according to the present embodiment in a case where a setting to change the sheet feed stage copy by copy is made. Processes of steps S1301 to S1315 are similar to those of steps S701 to S715 in FIG. 5. There are differences in that plain paper 3 (with a grammage of 91 to 105 gsm) is registered as the sheet for the manual sheet feed stage, sheets of plain paper 3 are set on the manual sheet feed stage, and needleless stapling is set.

In step S1316, the control unit 110 refers to the number of pages (sheet number information) included in the page data 621 and a prohibition table 1400 of FIG. 12 to be described below. With reference to the combination of the sheet type (plain paper 3) obtained in step S1315 and the needleless staple setting, the control unit 110 then detects that the number of pages exceeds the number of sheets of plain paper 3 for which needleless stapling is executable, i.e., three.

In step S1317, the MFP 100 deletes the staple settings for the first copy, the main copy, and the second and subsequent copies, the sub copy (copies), based on the detection result of step S1316.

Step S1318 and subsequent steps are similar to steps S718 to S722.

FIG. 12 is a diagram illustrating an example of the prohibition table 1400 of sheet types and staple types, stored in the MFP 100 according to the present embodiment. The prohibition table 1400 indicates whether staple processing can be performed and, if the staple processing can be performed, the number of processable sheets for each sheet type and each staple type.

As has been described, according to the present embodiment, it is determined whether the number of pages of the first copy, main copy, falls within the number of processable sheets based on the combination of the sheet type and the staple type. In a case where the specified staple setting is not executable in that combination, the control unit 110 deletes the staple settings for not only the main copy but also for the sub copies, and performs printing. Such control allows the staple setting not applied to the main copy product to be prevented from being reflected on the sub copy products during execution of the sub copy print function.

Other Embodiments

An embodiment of the present disclosure may be applied to either a system including a plurality of devices or an apparatus including a single device, The present disclosure is not limited to the foregoing embodiments. Various modifications (including organic combinations of the embodiments) may be made based on the gist of the present disclosure, and such modifications are not excluded from the scope of the present disclosure. That is, all configurations obtained by combining the foregoing embodiments and modifications thereof are covered by the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-219341, filed Nov. 14, 2017, which is hereby incorporated by reference herein in its entirety.

What is claimed is:

1. A printer configured to print an image on a sheet, wherein the printer includes a first sheet storage unit and a second sheet storage unit, and includes a post-processing unit configured to perform specific post-processing to the sheet on which the image has been printed, printer comprising:
   one or more processors; and
   one or more memories storing instructions that, when executed by the one or more processors, cause the printer to perform operations including:
   receiving print setting, wherein in the print setting, the first sheet storage unit storing sheets is specified for a first copy, the second sheet storage unit storing sheets is specified for a second copy, and both the first and second copies are set to be subjected to the specific post-processing, and
   determining, based on a sheet type set in the first sheet storage unit, whether the specific post-processing is unable to be performed for the first copy,
   wherein, in a case where it is determined that the specific post-processing is unable to be performed for the first copy, the post-processing unit neither performs the specific post-processing for the first copy nor the specific post-processing for the second copy.

2. The printer according to claim 1, wherein executing the instructions causes the printer to further perform operations including determining whether the specific post-processing is able to be performed based on sheet type information registered in association with a corresponding one of a plurality of sheet storage units to be used in printing.

3. The printer according to claim 2, wherein executing the instructions causes the printer to further perform operations including determining whether the specific post-processing is able to be performed based on the sheet type information and sheet number information to be used in printing a single copy.

4. The printer according to claim 3, wherein the sheet type information includes information about grammage.

5. The printer according to claim 1, wherein the specific post-processing includes staple processing.

6. The printer according to claim 1, wherein executing the instructions causes the printer to further perform operations including changing, based on a determination that the specific post-processing is unable to be performed for the first copy, the print setting so that the specific post-processing is neither performed for the first copy nor performed for the second copy.

7. The printer according to claim 1, wherein executing the instructions causes the printer to further perform operations including invalidating, based on a determination that the specific post-processing is unable to be performed for the first copy, setting that both the first and second copies are set to be subjected to the specific post-processing.

8. The printer according to claim 1, wherein, in a case where it is determined that the specific post-processing is unable to be performed for the first copy and the specific post-processing is able to be performed for the second copy, the post-processing unit neither performs the specific post-processing for the first copy nor the specific post-processing for the second copy.

9. A method for controlling a printer configured to print an image on a sheet, wherein the printer includes a first sheet storage unit and a second sheet storage unit, and includes a post-processing unit configured to perform specific post-processing to the sheet on which the image has been printed, the method comprising:
   receiving print setting, wherein in the print setting, the first sheet storage unit storing sheets is specified for a first copy, the second sheet storage unit storing sheets is specified for a second copy, and both the first and second copies are set to be subjected to the specific post-processing; and
   determining, based on a sheet type set in the first sheet storage unit, whether the specific post-processing is unable to be performed for the first copy,
   wherein, in a case where it is determined that the specific post-processing is unable to be performed for the first copy, the post-processing unit neither performs the specific post-processing for the first copy nor the specific post-processing for the second copy.

10. A non-transitory computer-readable storage medium storing a program to cause a computer to perform a method for controlling a printer configured to print an image on a sheet, wherein the printer includes a first sheet storage unit and a second sheet storage unit, and includes a post-processing unit configured to perform specific post-processing to the sheet on which the image has been printed, the method comprising:
   receiving print setting, wherein in the print setting, the first sheet storage unit storing sheets is specified for a first copy, the second sheet storage unit storing sheets is specified for a second copy, and both the first and second copies are set to be subjected to the specific post-processing; and
   determining, based on a sheet type set in the first sheet storage unit, whether the specific post-processing is unable to be performed for the first copy,
   wherein, in a case where it is determined that the specific post-processing is unable to be performed for the first copy, the post-processing unit neither performs the specific post-processing for the first copy nor the specific post-processing for the second copy.

11. A printer configured to print an image on a sheet, wherein the printer includes a first sheet storage unit and a second sheet storage unit, and includes a post-processing unit configured to perform specific post-processing to the sheet on which the image has been printed, the printer comprising:
   one or more processors; and
   one or more memories storing instructions that, when executed by the one or more processors, cause the printer to perform operations including:
   receiving print setting, wherein in the print setting, the first sheet storage unit storing sheets is specified for a first copy, the second sheet storage unit storing sheets is specified for a second copy, and both the first and second copies are set to be subjected to the specific post-processing,
   determining, based on a sheet type set in the first sheet storage unit, whether the specific post-processing is unable to be performed for the first copy, and
   performing, based on a determination that the specific post-processing is unable to be performed for the first copy, a control such that the specific post-processing is not performed for the first copy and the specific post-processing is not performed for the second copy.

12. The printer according to claim 11, wherein executing the instructions causes the printer to further perform operations including determining whether the specific post-processing is able to be performed based on sheet type information registered in association with a corresponding one of a plurality of sheet storage units to be used in printing.

13. The printer according to claim 12, wherein executing the instructions causes the printer to further perform operations including determining whether the specific post-processing is able to be performed based on the sheet type information and sheet number information to be used in printing a single copy.

14. The printer according to claim 13, wherein the sheet type information includes information about grammage.

15. The printer according to claim 11, wherein the specific post-processing includes staple processing.

16. The printer according to claim 11, wherein executing the instructions causes the printer to further perform operations including changing, based on a determination that the specific post-processing is unable to be performed for the first copy, the print setting so that the specific post-processing is neither performed for the first copy nor performed for the second copy.

17. The printer according to claim 11, wherein executing the instructions causes the printer to further perform operations including invalidating, based on a determination that the specific post-processing is unable to be performed for the first copy, setting that both the first and second copies are set to be subjected to the specific post-processing.

18. The printer according to claim 11, wherein executing the instructions causes the printer to further perform operations including performing, based on a determination that the specific post-processing is unable to be performed for the first copy, a control such that the specific post-processing is not performed for the first copy and the specific post-processing is not performed for the second copy even if the specific post-processing is able to be performed for the second copy.

19. A method for a printer configured to print an image on a sheet, wherein the printer includes a first sheet storage unit and a second sheet storage unit, and includes a post-processing unit configured to perform specific post-processing to the sheet on which the image has been printed, the method comprising:
receiving print setting, wherein in the print setting, the first sheet storage unit storing sheets is specified for a first copy, the second sheet storage unit storing sheets is specified for a second copy, and both the first and second copies are set to be subjected to the specific post-processing;
determining, based on a sheet type set in the first sheet storage unit, whether the specific post-processing is unable to be performed for the first copy; and
performing, based on a determination that the specific post-processing is unable to be performed for the first copy, a control such that the specific post-processing is not performed for the first copy and the specific post-processing is not performed for the second copy.

20. A non-transitory computer-readable storage medium storing a program to cause a computer to perform a method for a printer configured to print an image on a sheet, wherein the printer includes a first sheet storage unit and a second sheet storage unit, and includes a post-processing unit configured to perform specific post-processing to the sheet on which the image has been printed, the method comprising:
receiving print setting, wherein in the print setting, the first sheet storage unit storing sheets is specified for a first copy, the second sheet storage unit storing sheets is specified for a second copy, and both the first and second copies are set to be subjected to the specific post-processing;
determining, based on a sheet type set in the first sheet storage unit, whether the specific post-processing is unable to be performed for the first copy; and
performing, based on a determination that the specific post-processing is unable to be performed for the first copy, a control such that the specific post-processing is not performed for the first copy and the specific post-processing is not performed for the second copy.

* * * * *